United States Patent
Tanabe (10) Patent No.: US 9,749,018 B2
(45) Date of Patent: Aug. 29, 2017

(54) POWER TRANSMISSION APPARATUS AND METHOD FOR CONTROLLING POWER TRANSMISSION

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/251,814

(22) Filed: Aug. 30, 2016

(65) Prior Publication Data

US 2017/0063433 A1   Mar. 2, 2017

(30) Foreign Application Priority Data

Aug. 31, 2015   (JP) ................................. 2015-171364

(51) Int. Cl.
| | |
|---|---|
| *H04B 5/00* | (2006.01) |
| *H04L 12/26* | (2006.01) |
| *H04L 29/06* | (2006.01) |
| *H04W 4/00* | (2009.01) |

(52) U.S. Cl.
CPC ........... *H04B 5/0037* (2013.01); *H04L 43/16* (2013.01); *H04L 69/28* (2013.01); *H04W 4/008* (2013.01)

(58) Field of Classification Search
CPC ....... H04B 5/0037; H04L 43/16; H04L 69/28; H04W 4/008
USPC ........................................................ 455/41.1
See application file for complete search history.

(56) References Cited

U.S. PATENT DOCUMENTS

| | | | | |
|---|---|---|---|---|
| 6,657,173 B2* | 12/2003 | Flugstad | .................. | A23B 4/01 219/771 |
| 6,784,405 B2* | 8/2004 | Flugstad | .................. | A23B 4/01 219/497 |
| 7,518,343 B2* | 4/2009 | Veselic | ................... | G06F 1/266 320/114 |
| 7,663,502 B2* | 2/2010 | Breed | ..................... | B60C 11/24 340/12.25 |
| 7,768,239 B2* | 8/2010 | Veselic | ................... | G06F 1/266 320/112 |
| 7,847,517 B2* | 12/2010 | Guthrie | ................... | G06F 1/263 320/107 |
| 7,882,297 B2* | 2/2011 | Sisto | ....................... | G06F 1/266 710/306 |
| 8,111,040 B2* | 2/2012 | Guthrie | ................... | G06F 1/263 320/107 |
| 8,185,759 B1* | 5/2012 | Li | ......................... | G06F 13/105 710/305 |

(Continued)

FOREIGN PATENT DOCUMENTS

JP          2011045190 A      3/2011

*Primary Examiner* — Hai V Nguyen
(74) *Attorney, Agent, or Firm* — Canon U.S.A., Inc. IP Division (57) ABSTRACT

According to one embodiment, a power transmission apparatus wirelessly transmits power to an electronic device, acquires a value of a standing wave ratio relating to power to be transmitted to the electronic device, when a predetermined condition is satisfied, updates a reference value with the acquired value of the standing wave ratio when the acquired value of the standing wave ratio is smaller than the reference value, and detects removal of the electronic device when a difference between the acquired value of the standing wave ratio and the updated reference value is greater than a threshold.

12 Claims, 8 Drawing Sheets

(56) References Cited

U.S. PATENT DOCUMENTS

| | | | | |
|---|---|---|---|---|
| 9,197,075 B2* | 11/2015 | Jeansonne | ............... | G06F 1/266 |
| 9,306,399 B2* | 4/2016 | Kim | ............... | B60L 11/182 |
| 9,343,921 B2* | 5/2016 | Tanabe | ............... | H02J 7/025 |
| 9,438,058 B2* | 9/2016 | Degura | ............... | H02J 7/0068 |
| 9,525,209 B2* | 12/2016 | Tanabe | ............... | H01Q 7/00 |
| 9,560,541 B2* | 1/2017 | Mochizuki | ............... | H04L 25/02 |
| 2003/0052547 A1* | 3/2003 | Fischer | ............... | H01R 13/6675 307/154 |
| 2003/0054703 A1* | 3/2003 | Fischer | ............... | H02J 7/0027 439/894 |
| 2003/0076138 A1* | 4/2003 | Hwang | ............... | G06F 1/26 327/143 |
| 2004/0239294 A1* | 12/2004 | Veselic | ............... | G06F 1/266 320/155 |
| 2005/0046584 A1* | 3/2005 | Breed | ............... | B60C 11/24 340/13.31 |
| 2006/0208169 A1* | 9/2006 | Breed | ............... | B60N 2/002 250/221 |
| 2009/0122340 A1* | 5/2009 | Nagahama | ............... | G06F 3/1207 358/1.15 |
| 2010/0194206 A1* | 8/2010 | Burdo | ............... | G06F 1/266 307/104 |
| 2011/0018494 A1* | 1/2011 | Mita | ............... | H02J 7/025 320/108 |
| 2012/0286726 A1* | 11/2012 | Kim | ............... | B60L 11/182 320/108 |
| 2012/0293118 A1* | 11/2012 | Kim | ............... | H02J 5/005 320/108 |
| 2014/0292095 A1* | 10/2014 | Tsukamoto | ............... | H04B 5/0037 307/104 |
| 2014/0375137 A1* | 12/2014 | Ichikawa | ............... | H04B 5/0037 307/104 |
| 2015/0230116 A1* | 8/2015 | Mochizuki | ............... | H04L 25/02 370/252 |
| 2016/0036265 A1* | 2/2016 | Kim | ............... | H02J 5/005 320/108 |
| 2016/0294223 A1* | 10/2016 | Kim | ............... | B60L 11/182 |

* cited by examiner

POWER TRANSMISSION APPARATUS AND METHOD FOR CONTROLLING POWER TRANSMISSION

BACKGROUND

Field of the Invention

Aspects of the present invention relate to a power transmission apparatus capable of wirelessly supplying power to an electronic device, and a method for controlling power transmission.

Description of the Related Art

A wireless power transmission system is known in which power is wirelessly transmitted using an electromagnetic field resonance phenomenon or an electromagnetic induction phenomenon. In such a wireless power transmission system, when an electronic device that receives power is removed during power transmission, a power transmission apparatus is required to operate without any adverse effect on other devices and metals located in the neighborhood of the power transmission apparatus.

Japanese Patent Laid-Open No. 2011-45190 discloses a power transmission control device including: a control unit that controls power transmission of power to a power receiving device with a primary coil and a secondary coil by non-contact power transmission; and a communication process unit that performs communication control by communication between coils using the primary coil and the secondary coil. This power transmission control device is configured to set wireless communication between a power-transmitting-side wireless communication unit and a power-receiving-side wireless communication unit to a non-connected state when removal of the power receiving device is detected.

In the method disclosed in Japanese Patent Laid-Open No. 2011-45190, a power transmission apparatus detects a change in the waveform of an induced voltage signal (coil end signal) from the primary coil, thereby detecting removal of the electronic device. However, the waveform of the dielectric voltage signal may vary depending on, for example, transmission power to be output, a change in the load of the electronic device, or the position where the electronic device is placed. Accordingly, if removal of an electronic device is to be detected using only a change in the waveform of the induced voltage signal, it is difficult to accurately detect removal of the electronic device.

SUMMARY

According to an aspect of the present invention, a power transmission apparatus facilitates detection of removal of an electronic device during wireless power transmission.

According to an aspect of the present invention, a method for controlling power transmission facilitates detection of removal of an electronic device during wireless power transmission.

According to an aspect of the present invention, there is provided a power transmission apparatus including a power transmission unit that wirelessly transmits power to an electronic device, an acquisition unit that acquires a value of a standing wave ratio relating to power to be transmitted to the electronic device, when a predetermined condition is satisfied, an update unit that updates a reference value with the acquired value of the standing wave ratio when the acquired value of the standing wave ratio is smaller than the reference value, and a detection unit that detects removal of the electronic device when a difference between the acquired value of the standing wave ratio and the updated reference value is greater than a threshold.

According to an aspect of the present invention, there is provided a method, the method including causing a power transmission unit to wirelessly transmit power to an electronic device, acquiring a value of a standing wave ratio relating to power to be transmitted to the electronic device, when a predetermined condition is satisfied, updating a reference value with the acquired value of the standing wave ratio when the acquired value of the standing wave ratio is smaller than the reference value, and detecting removal of the electronic device when a difference between the acquired value of the standing wave ratio and the updated reference value is greater than a threshold.

According to an aspect of the present invention, there is provided a non-transitory storage medium that stores a program causing a computer to execute a method, the method including causing a power transmission unit to wirelessly transmit power to an electronic device, acquiring a value of a standing wave ratio relating to power to be transmitted to the electronic device, when a predetermined condition is satisfied, updating a reference value with the acquired value of the standing wave ratio when the acquired value of the standing wave ratio is smaller than the reference value, and detecting removal of the electronic device when a difference between the acquired value of the standing wave ratio and the updated reference value is greater than a threshold.

Further features and aspects of the present invention will become apparent from the following description of exemplary embodiments.

DESCRIPTION OF THE EMBODIMENTS

First Exemplary Embodiment

Exemplary embodiments, features, and aspects of the present invention will be described below with reference to the drawings. However, aspects of the present invention are not limited to the following exemplary embodiments.

Figure 1:
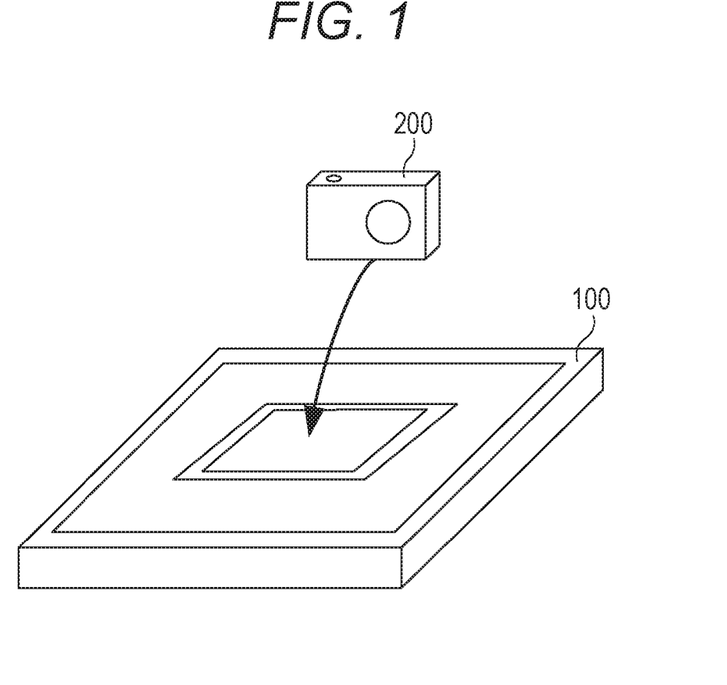
FIG. 1 is a view for illustrating an example of a configuration of a wireless power transmission system according to first to third exemplary embodiments.

FIG. 1 is a view for illustrating an example of a configuration of a wireless power transmission system according to first to third exemplary embodiments. As illustrated in FIG. 1, the wireless power transmission system includes, for example, a power transmission apparatus 100 and an electronic device 200. The power transmission apparatus 100 has a function for performing close proximity wireless communication based on an NFC (Near Field Communication) standard or Bluetooth standard, and a function for transmitting wireless power to the electronic device 200. The electronic device 200 has a function for performing close proximity wireless communication based on an NFC standard or Bluetooth standard, and a function for receiving wireless power from the power transmission apparatus 100 and charging the power. The power transmission apparatus 100 is configured to be operable as a power supply unit, and the electronic device 200 is configured to be operable as a power receiving device. The power transmission apparatus 100 can detect that the electronic device 200 is placed on the power transmission apparatus 100 and that the electronic device 200 is removed from the power transmission apparatus 100.

Figure 2:
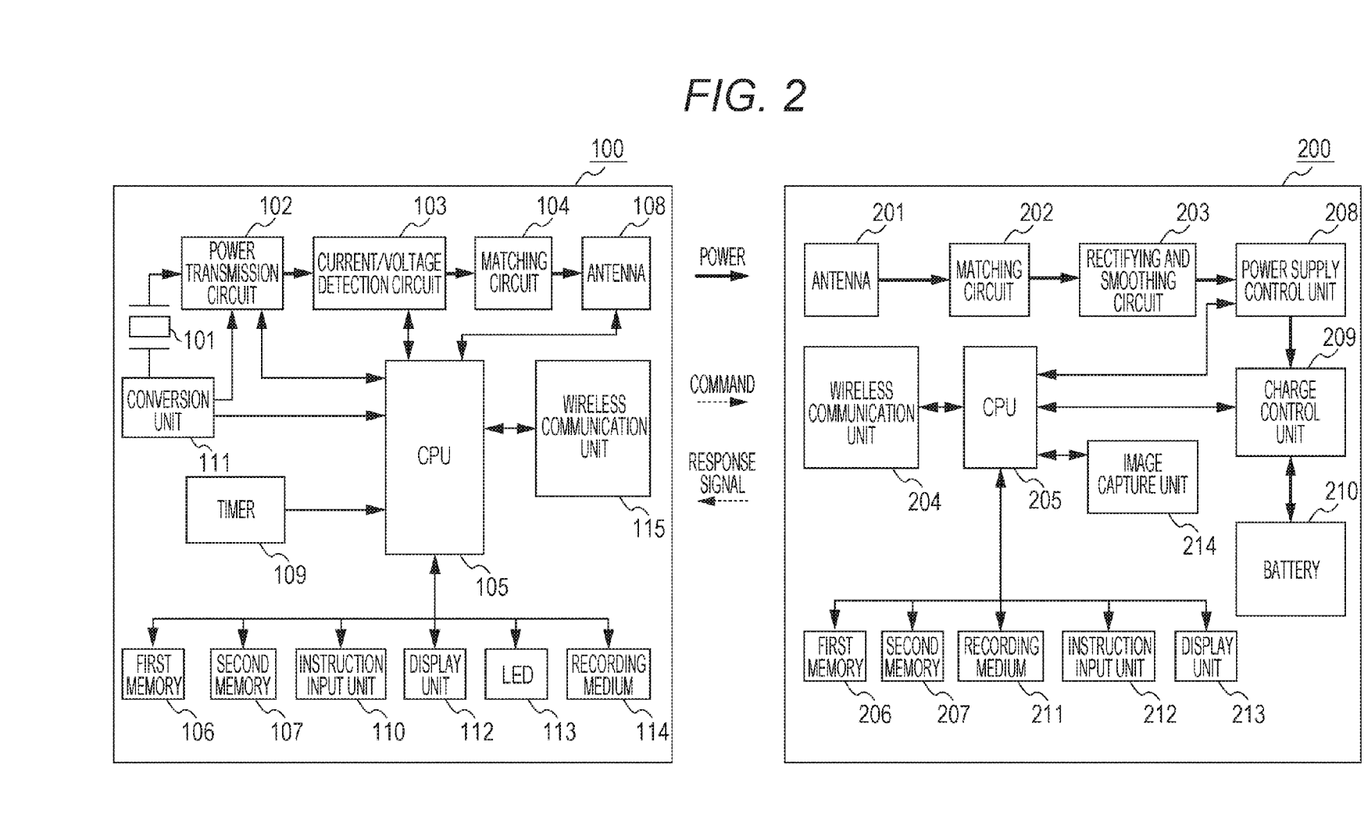
FIG. 2 is a block diagram for illustrating an example of components included in a power transmission apparatus 100 and an example of components included in an electronic device 200.

FIG. 2 is a block diagram for illustrating an example of components included in the power transmission apparatus 100 and an example of components included in the electronic device 200.

As illustrated in FIG. 2, the power transmission apparatus 100 includes an oscillator 101, a power transmission circuit 102, a current/voltage detection circuit 103, a matching circuit 104, a CPU (central processing unit) 105, a first memory 106, and a second memory 107. The power transmission apparatus 100 further includes an antenna 108, a timer 109, an instruction input unit 110, a conversion unit 111, a display unit 112, an LED 113, a recording medium 114, and a wireless communication unit 115.

The oscillator 101 is driven by power supplied from an AC power supply via the conversion unit 111, and oscillates a frequency used for controlling the power transmission circuit 102. A crystal oscillator or the like is used as the oscillator 101.

The power transmission circuit 102 generates power to be supplied to the electronic device 200 via the antenna 108 according to power supplied from the conversion unit 111 and the frequency oscillated by the oscillator 101. The power transmission circuit 102 includes an FET and the like formed therein, and controls a current flowing between source and drain terminals by a gate voltage of the internal FET according to the frequency oscillated by the oscillator 101, thereby generating power to be supplied to the electronic device 200. Power generated by the power transmission circuit 102 is supplied to each of the current/voltage detection circuit 103 and the matching circuit 104. The power transmission circuit 102 controls the gate voltage of the internal FET, thereby making it possible to change or stop power from the FET.

The current/voltage detection circuit 103 is a detection unit that detects a change in voltage or current. For example, the current/voltage detection circuit 103 detects information indicating an amplitude voltage V1 of a traveling wave of power output from the antenna 108, and information indicating an amplitude voltage V2 of a reflected wave of power output from the antenna 108. The information indicating the amplitude voltage V1 and the information indicating the amplitude voltage V2 which are detected by the current/voltage detection circuit 103 are supplied to the CPU 105.

The CPU 105 stores, in the second memory 107, the information indicating the amplitude voltage V1 and the information indicating the amplitude voltage V2 which are supplied from the current/voltage detection circuit 103.

The current/voltage detection circuit 103 detects the traveling wave of power output from the antenna 108 as the voltage of a capacitor by CM (inductive coupling and capacitive coupling) coupling. Further, the current/voltage detection circuit 103 uses an A/D converter to change the detected voltage of the capacitor from an analog value to a digital value, and supplies the digital value to the CPU 105.

The CPU 105 detects the voltage supplied from the A/D converter as the amplitude voltage V1 of the traveling wave and as the amplitude voltage V2 of the reflected wave. Then, the CPU 105 acquires a voltage reflection coefficient ρ using the amplitude voltage V1 of the traveling wave and the amplitude voltage V2 of the reflected wave. Further, the CPU 105 calculates the voltage standing wave ratio (VSWR) using the voltage reflection coefficient ρ. Hereinafter, the voltage standing wave ratio is referred to as "VSWR".

The term "VSWR" described herein refers to a value indicating a relationship between the traveling wave of power output from the antenna 108 and the reflected wave of power output from the antenna 108. VSWR indicates a state in which as the value of VSWR becomes closer to 1, the amount of reflected power decreases and the amount of loss of power to be supplied from the power transmission apparatus 100 to an external electric device decreases, which leads to a high efficiency.

The following formula (1) represents the voltage reflection coefficient ρ, and the following formula (2) represents VSWR.

$$\rho = V2/V1 \quad (1)$$

$$VSWR = (1+\rho)/(1-\rho) \quad (2)$$

While in the first exemplary embodiment, an example in which VSWR is calculated using the amplitude voltages V1 and V2 has been described above, VSWR may be calculated using a current of a traveling wave and a current of a reflected wave. In this case, the current/voltage detection circuit 103 may detect the current of the traveling wave and the current of the reflected wave.

The matching circuit 104 is a resonance circuit that resonates at a resonance frequency f by the antenna 108 and the capacitance of the capacitor according to the frequency oscillated by the oscillator 101. Note that the resonance frequency f may be, for example, 50/60 Hz, which is a commercial frequency, 10 to several hundred kHz, or a frequency of about 10 MHz. Power generated by the power transmission circuit 102 in a state where the frequency oscillated by the oscillator 101 is set to the resonance frequency f is supplied to the antenna 108 via the matching circuit 104.

When the AC power supply and the power transmission apparatus 100 are connected to each other, the CPU 105 controls the components of the power transmission apparatus 100 by power supplied from the AC power supply via the conversion unit 111. The CPU 105 executes one or more programs stored in the first memory 106, thereby controlling the components of the power transmission apparatus 100.

The CPU 105 controls the power transmission circuit 102 to thereby control power to be supplied to the electronic device 200. The CPU 105 controls the wireless communication unit 115, thereby performing communication with the electronic device 200. For example, the CPU 105 controls the wireless communication unit 115, thereby making a request for device authentication, acquisition of charge information, or the like. The CPU 105 converts the power transmission current, power transmission voltage, reflection current, and the reflection voltage from the current/voltage detection circuit 103, and the induced voltage from the antenna 108 from analog data into digital data, and stores the digital data in the second memory 107.

The CPU 105 controls the wireless communication unit 115 and acquires information about the device from the electronic device 200 and information about a status indicating an updated state of the electronic device 200. The information about the device is hereinafter referred to as "device information". The device information described herein includes information about a manufacturer name, a product name, a product model number, an ID (identification information), a serial number, and support functions.

The first memory 106 is a memory for storing one or more programs for controlling the components of the power transmission apparatus 100 and information about the operation and state of the components of the power transmission apparatus 100. Image data, such as menu information to be displayed on the display unit 112, is also stored in the first memory 106.

The second memory 107 is a rewritable memory. The second memory 107 can operate as a working memory for the CPU 105. Accordingly, the second memory 107 can store various pieces of information, data, values, parameters, and programs used for the CPU 105. The CPU 105 can store, in the second memory 107, various pieces of information, data, values, and parameters received from the electronic device 200.

The antenna 108 is an antenna for outputting power generated by the power transmission circuit 102 to the outside. The power transmission apparatus 100 supplies power to the electronic device 200 via the antenna 108.

The timer 109 measures, for example, a present time or a time for an operation or process performed by each of the components. The measured value is stored in a register provided in the timer 109. A threshold for the time measured by the timer 109 is preliminarily recorded in the first memory 106.

The instruction input unit 110 provides a user interface for inputting a user's instruction to the power transmission apparatus 100. The instruction input unit 110 includes a power button for turning on or off the power of the power transmission apparatus 100, a mode switching button for switching the operation mode of the power transmission apparatus 100, and the like. Each button is composed of a switch, a touch panel, and the like. The CPU 105 controls the power transmission apparatus 100 in accordance with a user's instruction input through the instruction input unit 110. The instruction input unit 110 may control the power transmission apparatus 100 in accordance with an instruction received from a remote controller.

When the AC power supply and the power transmission apparatus 100 are connected to each other, the conversion unit 111 converts an AC power supplied from the AC power supply into a DC power, and supplies the converted DC power to the entire power transmission apparatus 100.

The display unit 112 is a display unit that displays the content of the display generated by the CPU 105. For example, the display unit 112 is composed of a liquid crystal panel, an organic EL panel, or the like, and a control unit that controls these components.

The LED 113 is composed of a light emitting diode and controlled by the CPU 105, thereby emitting light to notify a user that the wireless communication unit 115 is controlled to perform communication, or that the power transmission circuit 102 is controlled to output power.

The recording medium 114 is a recording medium that stores data, such as an image and audio, and is composed of a flash memory, an HDD (Hard Disk Drive), or the like. The recording medium 114 may be detachable from the power transmission apparatus 100.

The wireless communication unit 115 is a hardware block composed of communication processing circuit for performing wireless communication, and a built-in antenna. For example, the wireless communication unit 115 performs a communication process based on the NFC standard, a communication process based on the Bluetooth standard, and the like. In the case of the NFC standard, the antenna 108 for power transmission may be used for communication.

As illustrated in FIG. 2, the electronic device 200 includes an antenna 201, a matching circuit 202, a rectifying and smoothing circuit 203, a wireless communication unit 204, a CPU (central processing unit) 205, a first memory 206, and a second memory 207. The electronic device 200 further includes a power supply control unit 208, a charge control unit 209, a battery 210, a recording medium 211, an instruction input unit 212, a display unit 213, and an image capture unit 214.

The antenna 201 is an antenna for receiving power supplied from the power transmission apparatus 100. The electronic device 200 receives power from the power transmission apparatus 100 via the antenna 201.

The matching circuit 202 is a resonance circuit for performing impedance matching so that the antenna 201 resonates at the same frequency as the resonance frequency f of the power transmission apparatus 100. Like the matching circuit 104, the matching circuit 202 includes a capacitor, a coil, a resistance, or the like. The matching circuit 202 allows the antenna 201 to resonate at the same frequency as the resonance frequency f of the power transmission apparatus 100. The matching circuit 202 supplies power received by the antenna 201 to the rectifying and smoothing circuit 203.

The rectifying and smoothing circuit 203 eliminates the request and noise from power received by the antenna 201, and generates DC power. Further, the rectifying and smoothing circuit 203 supplies the generated DC power to the power supply control unit 208. The rectifying and smoothing circuit 203 includes a diode for rectification, and generates DC power by one of full-wave rectification and half-wave rectification. The DC power generated by the rectifying and smoothing circuit 203 is supplied to the power supply control unit 208.

The wireless communication unit 204 is a hardware block composed of a communication process circuit for performing wireless communication, and a built-in antenna. For example, the wireless communication unit 204 performs a communication process based on the NFC standard or Bluetooth standard.

The CPU 205 designates an address of a location to be accessed and a data size, thereby enabling read/write of desired data. The power transmission apparatus 100 may designate an address of a location to be accessed and a data size, thereby enabling read/write of desired data.

The CPU 205 executes one or more programs stored in the first memory 206, thereby controlling the components of the electronic device 200. The CPU 205 controls each of the power supply control unit 208 and the charge control unit 209, thereby supplying the components of the electronic device 200 with power supplied from the power transmission apparatus 100, and charging the battery 210. The CPU 205 controls the wireless communication unit 204 to perform a communication process. The CPU 205 can transmit a response to the request for device authentication from the power transmission apparatus 100 via the wireless communication unit 204, and can transmit a response to the request for acquiring charge information via the wireless communication unit 204.

The first memory 206 is a memory for storing one or more programs for controlling the components of the electronic device 200, and information about the operation and state of the components of the electronic device 200. Device information including information about the electronic device 200 is also recorded in the first memory 206.

The second memory 207 is a rewritable memory. The second memory 207 can operate as a working memory for the CPU 205. Accordingly, the second memory 207 can store various pieces of information, data, values, parameters, and programs used for the CPU 205. The CPU 205 can also store various pieces of information, data, values, and parameters, which are received from the power transmission apparatus 100, in the second memory 207.

The power supply control unit 208 is composed of a switching regulator or a linear regulator, and supplies the DC power supplied from one of the rectifying and smoothing circuit 203 and the external power supply to the charge control unit 209 and the entire electronic device 200.

When power is supplied from the power supply control unit 208, the charge control unit 209 charges the battery 210 with the supplied power. The charge control unit 209 periodically detects information about charging of the battery 210 connected to the electronic device 200, and supplies the information to the CPU 205. Then, the CPU 205 stores charge information indicating a battery state in the second memory 207.

The battery 210 is a chargeable battery and detachable from the electronic device 200. The battery 210 is, for example, a lithium ion battery. The battery 210 can supply power to the components of the electronic device 200. When no power is supplied via the power supply control unit 208, the battery 210 can also supply power to the components of the electronic device 200.

The recording medium 211 is a recording medium for storing data, such as an image and audio, and is composed of a flash memory, an HDD, or the like. The recording medium 211 may be detachable from the electronic device 200.

The instruction input unit 212 provides the electronic device 200 with a user interface for inputting a user's instruction. The instruction input unit 212 includes a power supply button for turning on or off the power of the electronic device 200, a mode switch button for switching the operation mode of the electronic device 200, and the like. Each button is composed of a switch, a touch panel, and the like. The CPU 205 controls the electronic device 200 in accordance with the user's instruction input through the instruction input unit 212. The instruction input unit 212 may control the electronic device 200 in accordance with an instruction received from a remote controller.

The display unit 213 is composed of a liquid crystal panel, an organic EL panel, or the like, and displays an operation screen, a captured image, and the like based on an instruction from the CPU 205. The display unit 213 may be configured to be movable, such as a variable-angle display. In this case, position information of the display unit 213 is converted into digital information and the digital information is sent to the CPU 205.

The image capture unit 214 includes a lens unit, an image sensor (a CMOS sensor or the like), an image data generating unit, and the like. The image sensor converts an optical image received via the lens unit into an electric signal. The image data generating unit generates image data (a still image or a moving image) from the electric signal output from the image sensor. The CPU 205 records image data generated by the image capture unit 214 in the recording medium 211. The image capture unit 214 also includes a lens control unit and controls zoom, focus, iris adjustment, and the like based on an instruction from the CPU 205.

The antenna 108 of the power transmission apparatus 100 and the antenna 201 of the electronic device 200 may be helical antennas, loop antennas, or planar antennas such as meander line antennas.

In the first exemplary embodiment, the process performed by the power transmission apparatus 100 can also be applied to a system in which the power transmission apparatus 100 wirelessly supplies power to the electronic device 200 by magnetic field coupling or electric field coupling. Similarly, in the first exemplary embodiment, the process performed by the electronic device 200 can also be applied to a system in which the power transmission apparatus 100 wirelessly supplies power to the electronic device 200 by magnetic field coupling or electric field coupling.

An electrode is provided on the power transmission apparatus 100 as the antenna 108 and an electrode is provided on the electronic device 200 as the antenna 201, so that aspects of the present invention can also be applied to a system in which the power transmission apparatus 100 supplies power to the electronic device 200 by electric field coupling.

The process performed by the power transmission apparatus 100 and the process performed by the electronic device 200 can also be applied to a system in which the power transmission apparatus 100 wirelessly supplies power to the electronic device 200 by electromagnetic induction.

In the first exemplary embodiment, the power transmission apparatus 100 wirelessly transmits power to the electronic device 200 and the electronic device 200 wirelessly receives power from the power transmission apparatus 100. However, the term "wirelessly" can also be expressed as "in a non-touch manner" or "in a non-contact manner".

Figure 3:
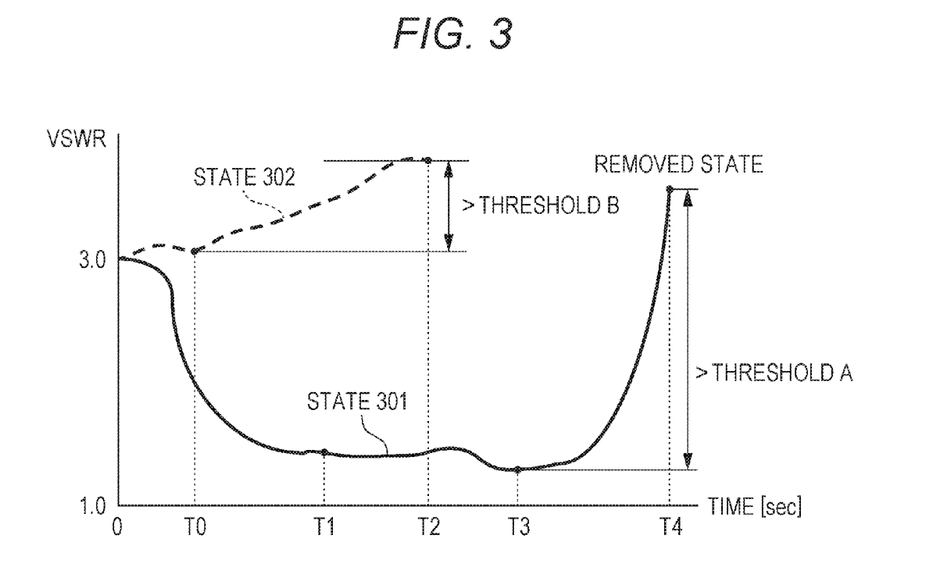
FIG. 3 is a graph for illustrating an example of a relationship between a time for removing the electronic device 200 and a change in VSWR.

FIG. 3 is a graph for illustrating an example of a relationship between a time for removing the electronic device 200 and a change in VSWR calculated by the CPU 105. Assume that the timing when the power transmission is started corresponds to a time 0 on an X-axis. The CPU 105 records information about the amount of change in VSWR in the recording medium 114.

In the case of a state 301, a period from a time T1 after the power transmission is started, the battery 210 is gradually supplied with power corresponds to a period for stabilizing the electronic device 200 as a load. In this period, the value of VSWR decreases. This tendency is because the impedance is matched so that the electronic device 200 is optimized to pull power as a load and when power is supplied to the battery 210, the value of VSWR decreases. In the state 301, during a period from time 0 to time T1, the VSWR is in an unstable state. After that, in the state 301, the value of VSWR rapidly increases during a period between time T3 indicating a time when the removal of the electronic device 200 is started and time T4 indicating a time when the removal of the electronic device 200 is completed. When a change in VSWR during the period from time T3 to time T4 is greater than "threshold A", the CPU 105 can determine that the electronic device 200 has been removed.

On the other hand, a state 302 indicates a state in which the electronic device 200 is removed before time T1 when the value of VSWR is stabilized. In this example, since the electronic device 200 is removed before the battery 210 is supplied with power, the value of VSWR continuously increases or decreases from time 0. The value of VSWR increases during a period from time T0 to time T2 when the subsequent value of VSWR is acquired. When a change in VSWR during a period from time T0 to time T2 is greater than "threshold B", the CPU 105 can determine that the electronic device 200 has been removed.

Figure 4:
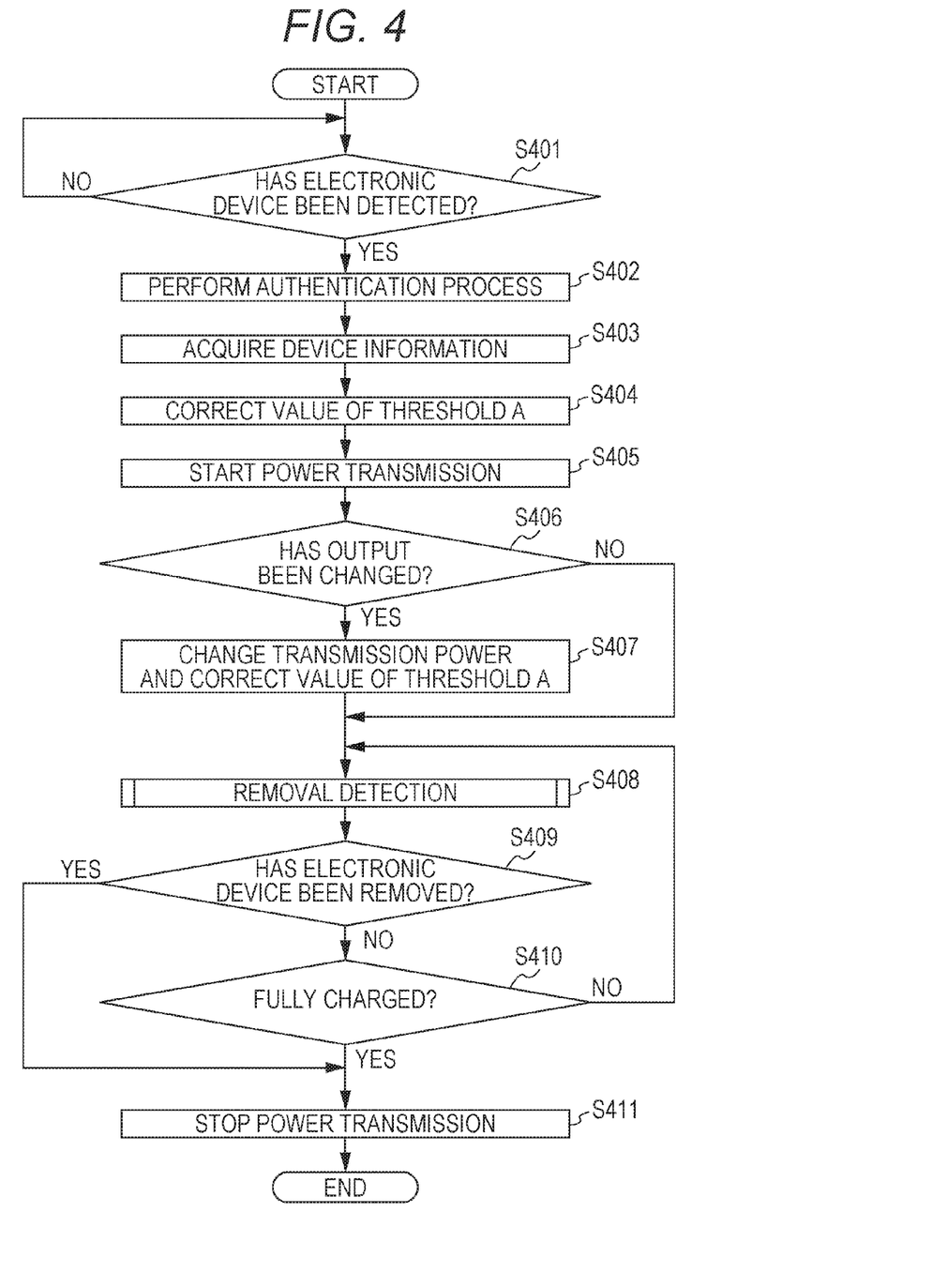
FIG. 4 is a flowchart for illustrating an example of a power transmission process performed by the power transmission apparatus 100.

FIG. 4 is a flowchart for illustrating an example of a power transmission process performed by the power transmission apparatus 100. This power transmission process is controlled such that the CPU 105 executes a program stored in the first memory 106.

In S401, the CPU 105 transmits a polling request, which is a request for detecting the electronic device 200, from the wireless communication unit 115 to the electronic device 200, and determines whether or not the wireless communication unit 115 has received a response to the polling request. For example, in the case of NFC communication, the CPU 105 transmits SENS_REQ to the electronic device 200 from the wireless communication unit 115, and determines whether or not the wireless communication unit 115 has received SENS_RES. When the wireless communication unit 115 has received a response to the polling request, the CPU 105 proceeds from S401 to S402.

In S402, the CPU 105 performs an authentication process together with the electronic device 200, and proceeds from S402 to S403.

In S403, the CPU 105 transmits a read request from the wireless communication unit 115 to the electronic device 200. The wireless communication unit 115 acquires, from the electronic device 200, NDEF (NFC Data Exchange Format) information including device information and charge information, and stores the acquired NDEF information in the second memory 107. Thus, the CPU 105 can learn the device information and charge information of the electronic device 200. Then, the CPU 105 proceeds from S403 to S404.

In S404, the CPU 105 corrects the value of the threshold A from the device information acquired by the process of S403. At this time, the CPU 105 corrects the value of the threshold A for each device, based on the amount of change in VSWR during the previous removal recorded in the recording medium 114 and on the information associated with the ID included in the device information. For example, when the initial value of the threshold A is 5 and the amount of change in the previous VSWR is 4, the threshold A is set to 3 which is a value smaller than 4. The value of the threshold A may be included in the device information acquired from the electronic device 200.

The threshold A may be composed of values as a table according to the value of VSWR for each time. For example, when VSWR at time T1 is 1.5, the threshold A may be changed to 5.0, and when VSWR is 2.0, the threshold A may be changed to 8.0. The CPU 105 proceeds from S404 to S405.

In S405, the CPU 105 notifies the electronic device 200 that the power transmission is to be started. Then, the CPU 105 controls the power transmission circuit 102 to be set to a predetermined power, and supplies wireless power to the electronic device 200 by using the matching circuit 104 and the antenna 108. At this time, the CPU 105 causes the timer 109 to operate when the supply of wireless power is started. The CPU 105 proceeds from S405 to S406.

In S406, the CPU 105 determines whether or not to change the output level of wireless power to a higher output level. As a result of this determination, when the output level of wireless power is changed to a higher output level (YES in S406), the CPU 105 proceeds from S406 to S407. On the other hand, when the output level of wireless power is not changed to a higher output level (NO in S406), the CPU 105 proceeds from S406 to S408.

In S407, the CPU 105 controls the power transmission circuit 102 to change the output level of wireless power to a higher output level. The threshold A is changed in accordance with the changed output level. For example, when the output level of wireless power is changed to 1 W, the CPU 105 changes the threshold A to 4.0. When the output level of wireless power is changed to 3 W, the CPU 105 changes the threshold A to 6.0. Then, the CPU 105 proceeds from S407 to S408.

In S408, the CPU 105 performs a removal detection process for detecting removal of the electronic device 200. Details of the removal detection process in S408 will be described later with reference to FIG. 5, 7, or 8. The CPU 105 proceeds from S408 to S409.

In S409, the CPU 105 determines whether or not a device removal flag stored in the second memory 107 is turned on. Note that the device removal flag is set in the process of S408 described later, and is stored in the second memory 107. As a result of this determination, when the device removal flag is on (YES in S409), the CPU 105 determines that the device has been removed, and proceeds from S409 to S411. On the other hand, when the device removal flag is off (NO in S409), the CPU 105 proceeds from S409 to S410.

In S410, the CPU 105 determines whether or not the battery 210 of the electronic device 200 is fully charged, based on the charge information acquired from the electronic device 200 in S408. As a result of this determination, when the battery 210 is fully charged (YES in S410), the CPU 105 proceeds from S410 to S411. On the other hand, when the battery 210 is not fully charged (NO in S410), the CPU 105 returns from S410 to S408.

In S411, the CPU 105 controls the power transmission circuit 102 to stop the supply of power, and terminates the power transmission process.

Figure 5:
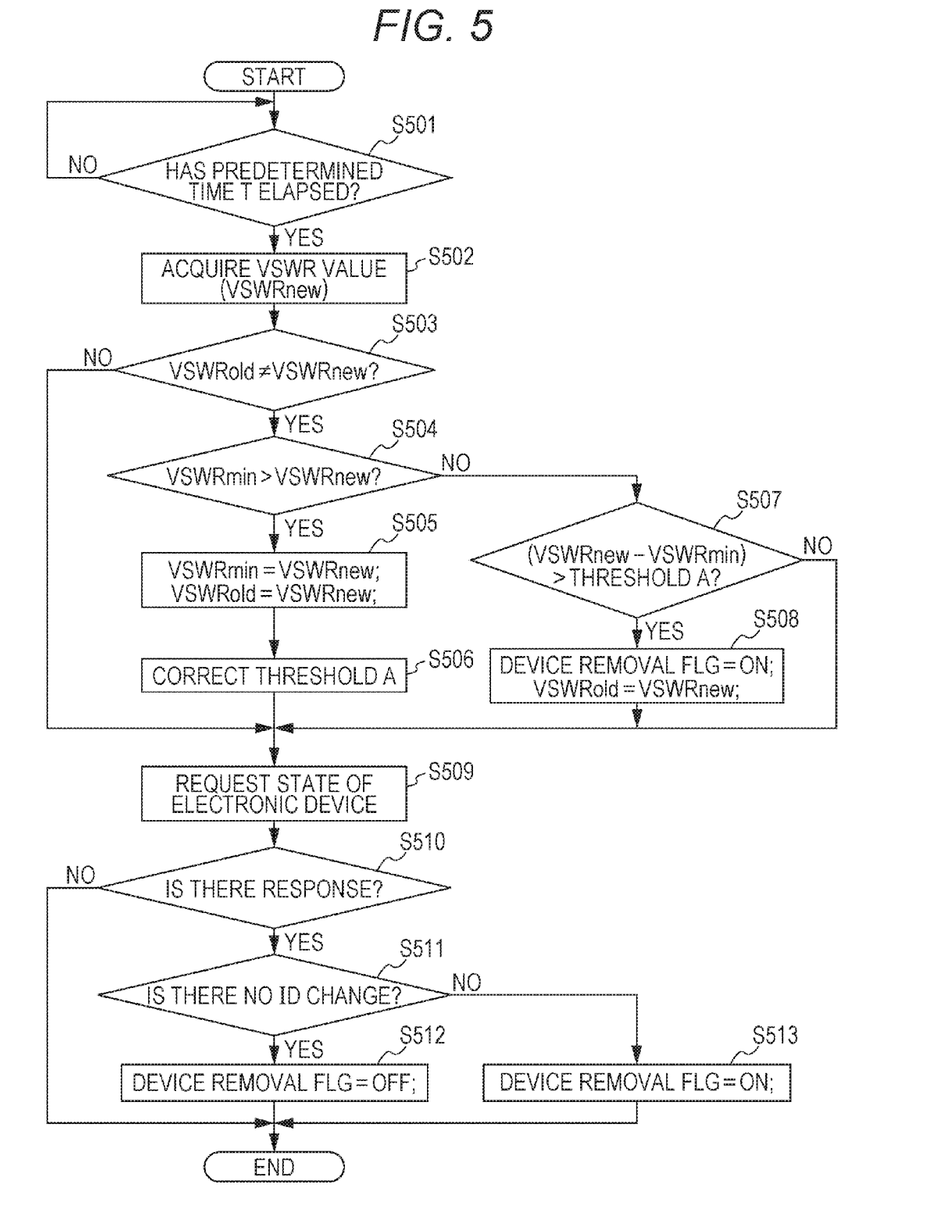
FIG. 5 is a flowchart for illustrating a first example of a removal detection process performed in S408 illustrated in FIG. 4.

FIG. 5 is a flowchart for illustrating a first example of the removal detection process performed in S408 illustrated in FIG. 4. This removal detection process is controlled such that the CPU 105 executes a program stored in the first memory 106.

In S501, the CPU 105 determines whether or not a predetermined time T which is sufficient for acquiring VSWR has elapsed. For example, the predetermined time T which is sufficient for acquiring VSWR after the power transmission is started may be set to time T1 illustrated in FIG. 3, or may be set to a longer time. When the predetermined time T has elapsed (YES in S501), the CPU 105 proceeds from S501 to S502.

In S502, the CPU 105 acquires a power transmission current, a power transmission voltage, a reflection current, and a reflection voltage from the current/voltage detection circuit 103, and calculates the value of VSWR. The CPU 105 stores the VSWR calculated in S502 in the second memory 107 as $VSWR_{new}$. Then, the CPU 105 proceeds from S502 to S503.

In S503, the CPU 105 compares the $VSWR_{old}$ stored in the second memory 107 with the $VSWR_{new}$ calculated in S502, and determines whether or not they are different from each other. As a result of this determination, when $VSWR_{old}$ and $VSWR_{new}$ are different (YES in S503), the CPU 105 proceeds from S503 to S504. On the other hand, when $VSWR_{old}$ and $VSWR_{new}$ match (NO in S503), the CPU 105 proceeds from S503 to S509.

In S504, the CPU 105 compares $VSWR_{min}$ stored in the second memory 107 with $VSWR_{new}$ calculated in S502. Then, the CPU 105 determines whether or not $VSWR_{min}$ is greater than $VSWR_{new}$. As a result of this determination, when $VSWR_{min}$ is greater than $VSWR_{new}$ (YES in S504), the CPU 105 proceeds from S504 to S505. When $VSWR_{min}$ is not greater than $VSWR_{new}$ (NO in S504), the CPU 105 proceeds from S504 to S507.

In S505, the CPU 105 replaces the value of $VSWR_{min}$ stored in the second memory 107 with the value of $VSWR_{new}$ calculated in S502, and replaces the value of $VSWR_{old}$ stored in the second memory 107 with the value of $VSWR_{new}$ acquired in S502. Then, the CPU 105 proceeds from S505 to S506.

In S506, the CPU 105 corrects the threshold A for detecting removal of the electronic device 200 according to the value of $VSWR_{min}$ stored in the second memory 107. For example, when the value of $VSWR_{min}$ stored in the second memory 107 is 1.4, the CPU 105 corrects the threshold A to 8.0. For example, when the value of $VSWR_{min}$ stored in the second memory 107 is 1.8, the CPU 105 corrects the threshold A to 8.5. Then, the CPU 105 proceeds from S506 to S509.

On the other hand, in S507, the CPU 105 determines whether or not the difference between $VSWR_{new}$ and the reference value $VSWR_{min}$ is greater than the threshold A. As a result of this determination, when the difference between $VSWR_{new}$ and $VSWR_{min}$ is greater than the threshold A (YES in S507), the CPU 105 proceeds from S507 to S508. On the other hand, when the difference between $VSWR_{new}$ and $VSWR_{min}$ is not greater than the threshold A (NO in S507), the CPU 105 proceeds from S507 to S509.

In S508, the CPU 105 turns on the device removal flag stored in the second memory 107. Further, the CPU 105 replaces the value of $VSWR_{old}$ stored in the second memory 107 with the value of $VSWR_{new}$ calculated in S502, and proceeds from S508 to S509.

In S509, the CPU 105 transmits a command for acquiring device information about an external device from the wireless communication unit 115 to the external device, and the CPU 105 proceeds from S509 to S510.

In S510, the CPU 105 determines whether or not the wireless communication unit 115 has received a response to the command transmitted in S509. As a result of this determination, when the wireless communication unit 115 has received the response to the command transmitted in S509 (YES in S510), the CPU 105 proceeds from S510 to S511. When the wireless communication unit 115 has not received the response to the command transmitted in S509 (NO in S510), the CPU 105 terminates the removal detection process.

In S511, the CPU 105 determines whether or not the external device is the electronic device 200 by using the device information (e.g., identification information of the external device is included) received from the external device and the device information (e.g., identification information of the electronic device 200 is included) of the electronic device 200 acquired in S403. For example, when the identification information of the external device matches the identification information of the electronic device 200, it is determined that the external device is the electronic device 200. When the identification information of the external device does not match the identification information of the electronic device 200, it is determined that the external device is not the electronic device 200. As a result of this determination, when the external device is the electronic device 200 (YES in S511), the CPU 105 proceeds from S511 to S512. When the external device is not the electronic device 200 (NO in S511), the CPU 105 determines that the electronic device 200 has been removed, and proceeds from S511 to S513.

In S512, the CPU 105 turns off the device removal flag stored in the second memory 107, and terminates the removal detection process.

On the other hand, in S513, the CPU 105 turns on the device removal flag stored in the second memory 107, and terminates the removal detection process.

Figure 6:
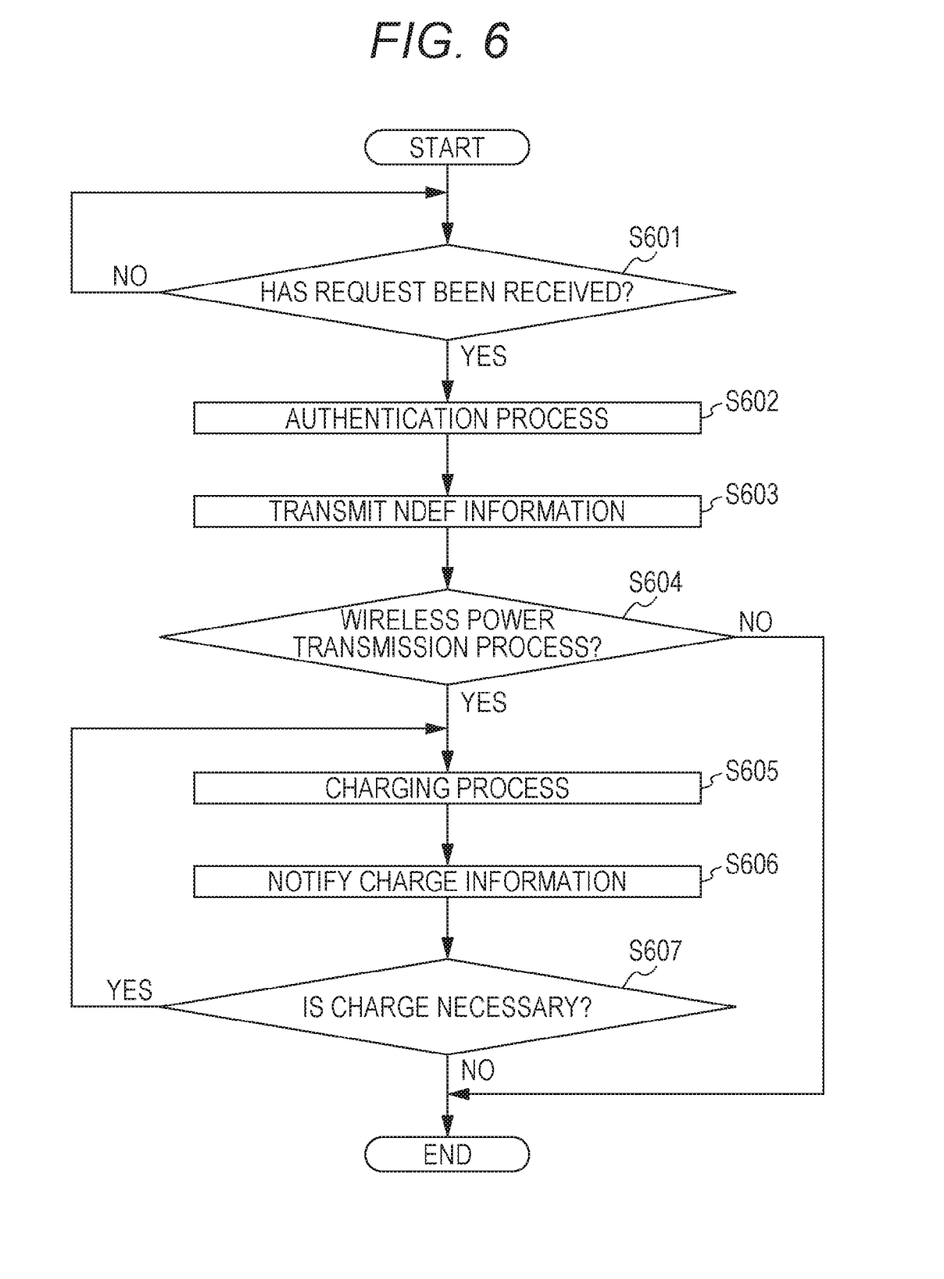
FIG. 6 is a flowchart for illustrating an example of a power receiving process performed by the electronic device 200.

FIG. 6 is a flowchart for illustrating an example of a power receiving process performed by the electronic device 200. This power receiving process is controlled such that the CPU 205 executes a program stored in the first memory 206.

In S601, the CPU 205 determines whether or not the wireless communication unit 204 has received, from the power transmission apparatus 100, the polling request which is a request for detecting the electronic device 200. When the wireless communication unit 204 has received the polling request from the power transmission apparatus 100 (YES in S601), the CPU 205 proceeds from S601 to S602.

In S602, the CPU 205 performs an authentication process together with the power transmission apparatus 100, and proceeds from S602 to S603.

In S603, the CPU 205 generates NDEF information including the device information preliminarily recorded in the first memory 206 and the charge information acquired from the charge control unit 209, and stores the generated NDEF information in the second memory 207. Then, when the CPU 205 has received a read request from the power transmission apparatus 100, the CPU 205 transmits the NDEF information stored in the second memory 207 from the wireless communication unit 204 to the power transmission apparatus 100. Instead of the CPU 205, the wireless communication unit 204 may generate the NDEF information. Then, the CPU 205 proceeds from S603 to S604.

In S604, the CPU 205 determines whether or not the wireless communication unit 204 has received, from the power transmission apparatus 100, a command indicating that the power transmission is started. When the command indicating that the power transmission is started is received (YES in S604), the CPU 205 proceeds from S604 to S605. When the command indicating that the power transmission is started is not received after waiting for a predetermined time (NO in S604), the CPU 205 terminates the power receiving process.

In S605, the CPU 205 receives wireless power from the power transmission apparatus 100 by use of the antenna 201, the matching circuit 202, the rectifying and smoothing circuit 203, and the power supply control unit 208. The charge control unit 209 charges the battery 210 with wireless power received from the power transmission apparatus 100. Then, the CPU 205 proceeds from S605 to S606.

In S606, the CPU 205 controls the charge control unit 209 to acquire charge information, and stores the charge information of the battery 210 in the second memory 207. Then, when the wireless communication unit 204 has received a command for acquiring the device information and charge information from the power transmission apparatus 100, the CPU 205 transmits the device information and charge information of the electronic device 200 from the wireless communication unit 204 to the power transmission apparatus 100. Then, the CPU 205 proceeds from S606 to S607.

In S607, the CPU 205 determines whether or not the battery 210 is fully charged by using the charge information acquired in S606. When the battery 210 is not fully charged (YES in S607), the CPU 205 returns from S607 to S605. When the battery 210 is fully charged (NO in S607), the CPU 205 terminates the power receiving process.

As described above, in the first exemplary embodiment, the power transmission apparatus 100 can detect removal of the electronic device 200 regardless of the position where the electronic device 200 is placed, the type of an electronic device, and the like.

Second Exemplary Embodiment

Next, a second exemplary embodiment will be described. In the first exemplary embodiment, the timing when the value of VSWR acquired is after the condition that the predetermined time T has elapsed is satisfied. On the other hand, in the second exemplary embodiment, a removal detection process when the value of VSWR is acquired after power is stabilized will be described. The configuration of the wireless power transmission system according to the second exemplary embodiment is similar to that of the first exemplary embodiment, and the components included in the power transmission apparatus 100 according to the second exemplary embodiment and the components included in the electronic device 200 according to the second exemplary embodiment are similar to those of the first exemplary embodiment, and thus descriptions thereof are omitted. The power transmission process performed by the power transmission apparatus 100 in the second exemplary embodiment and the power receiving process performed in the electronic device 200 in the second exemplary embodiment are similar to those of the first exemplary embodiment, and thus descriptions thereof are omitted.

Figure 7:
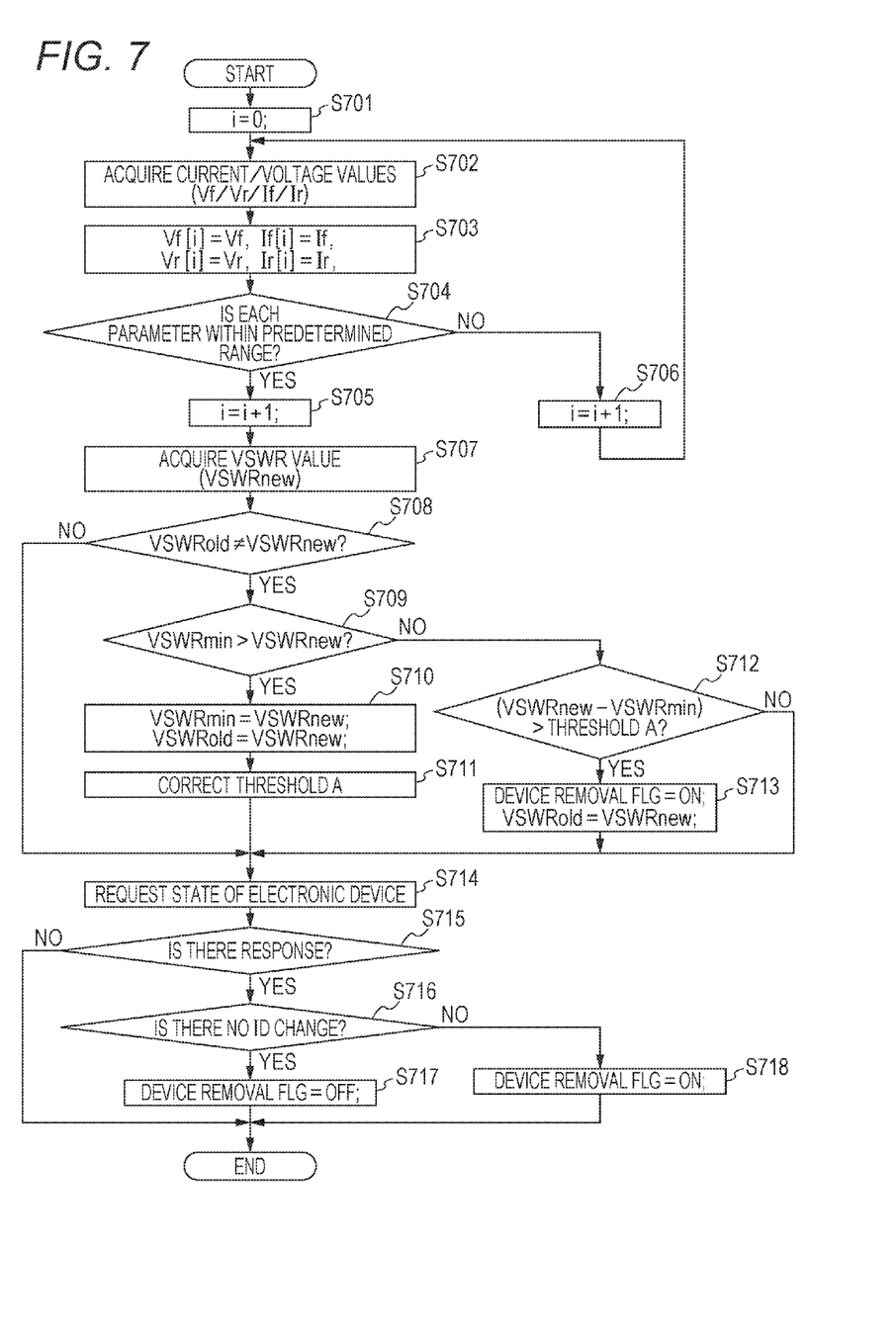
FIG. 7 is a flowchart for illustrating a second example of the removal detection process performed in S408 illustrated in FIG. 4.

FIG. 7 is a flowchart for illustrating a second example of the removal detection process performed in S408 illustrated in FIG. 4. This removal detection process is controlled such that the CPU 105 executes a program stored in the first memory 106. The process performed in S707 to S718 in FIG. 7 is similar to the process performed in S502 to S513 illustrated in FIG. 5, and thus descriptions thereof are omitted.

In S701, the CPU 105 initializes a variable i for designating a sequence number so that current information and voltage information are stored in the form of a sequence in the second memory 207. Then, the CPU 105 proceeds from S701 to S702.

In S702, the CPU 105 acquires a power transmission current If, a power transmission voltage Vf, a reflection current Ir, and a reflection voltage Vr from the current/voltage detection circuit 103, and stores them in the second memory 107. Then, the CPU 105 proceeds from S702 to S703.

In S703, the CPU 105 stores the power transmission current If, the power transmission voltage Vf, the reflection current Ir, and the reflection voltage Vr, which are acquired in S702, as a power transmission current If[i], a power transmission voltage Vf[i], a reflection current Ir[i], and a reflection voltage Vr[i]. Then, the CPU 105 proceeds from S703 to S704.

In S704, the CPU 105 determines whether or not at least one of the power transmission current If[i], the power transmission voltage Vf[i], the reflection current Ir[i], and the reflection voltage Vr[i] falls within a predetermined range. The predetermined range is determined in such a manner that the value of VSWR can be calculated in a state where at least one of the power transmission current, the power transmission voltage, the reflection current, and the reflection voltage is stabilized. Accordingly, the predetermined range may be a fixed value or a value determined as a result of measurement obtained n (n is an integer not less than 1) times before the present measurement.

As a result of this determination, when at least one of the power transmission current If[i], the power transmission voltage Vf[i], the reflection current Ir[i], and the reflection voltage Vr[i] falls within the predetermined range (YES in S704), the CPU 105 proceeds from S704 to S705. On the other hand, when at least one of the power transmission current If[i], the power transmission voltage Vf[i], the reflection current Ir[i], and the reflection voltage Vr[i] does not fall within the predetermined range (NO in S704), the CPU 105 proceeds from S704 to S706.

In S705, the CPU 105 increments the value of the variable i and stores the value in the second memory 107, and the CPU 105 proceeds from S705 to S707.

In S706, the CPU 105 increments the value of the variable i and stores the value in the second memory 107, and then the CPU 105 returns from S706 to S702.

As described above, in the second exemplary embodiment, the power transmission apparatus 100 can calculate the value of VSWR in a state where at least one of the power transmission current, the power transmission voltage, the reflection current, and the reflection voltage is stabilized. Consequently, the accuracy of removal detection can be enhanced.

Third Exemplary Embodiment

Next, a third exemplary embodiment will be described. In the first exemplary embodiment, the timing when the value of VSWR is acquired is after the condition that the predetermined time has elapsed is satisfied. On the other hand, in the third exemplary embodiment, a removal detection process when the electronic device 200 is removed before the time T1 illustrated in FIG. 3 will be described. The configuration of the wireless power transmission system according to the third exemplary embodiment is similar to that of the first exemplary embodiment, and the components included in the power transmission apparatus 100 in the third exemplary embodiment and the components included in the electronic device 200 in the third exemplary embodiment are similar to those in the first exemplary embodiment, and thus descriptions thereof are omitted. The power transmission process performed by the power transmission apparatus 100 in the third exemplary embodiment and the power receiving process performed by the electronic device 200 in the third exemplary embodiment are also similar to those of the first exemplary embodiment, and thus descriptions thereof are omitted.

Figure 8:
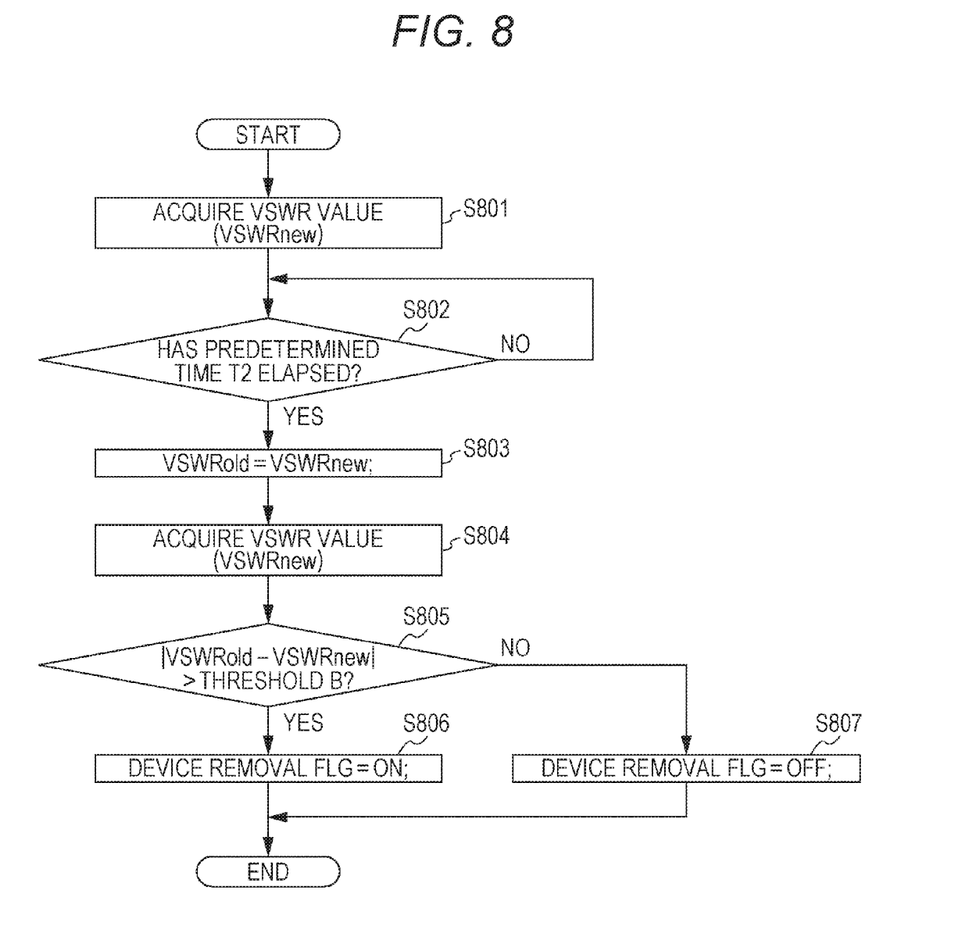
FIG. 8 is a flowchart for illustrating a third example of the removal detection process performed in S408 illustrated in FIG. 4.

FIG. 8 is a flowchart for illustrating a third example of the removal detection process performed in S408 illustrated in FIG. 4. This removal detection process is controlled such that the CPU 105 executes a program stored in the first memory 106. For example, this removal detection process is started immediately after the power transmission from the power transmission apparatus 100 is started.

In S801, the CPU 105 acquires, from the current/voltage detection circuit 103, a power transmission current, a power transmission voltage, a reflection current, and a reflection voltage, and calculates the value of VSWR. The CPU 105 stores the VSWR calculated in S801 in the second memory 107 as $VSWR_{new}$. Then, the CPU 105 proceeds from S801 to S802.

In S802, the CPU 105 determines whether or not the time T2 illustrated in FIG. 3 has elapsed. When the time T2 has elapsed (YES in S802), the CPU 105 proceeds from S802 to S803.

In S803, the CPU 105 replaces the value of $VSWR_{old}$ stored in the second memory 107 with the value of $VSWR_{new}$ calculated in S801. Then, the CPU 105 proceeds from S803 to S804.

In S804, the CPU 105 acquires the power transmission current, power transmission voltage, reflection current, and reflection voltage from the current/voltage detection circuit 103, and calculates the value of VSWR. The CPU 105 stores, in the second memory 107, the VSWR calculated in S804 as $VSWR_{new}$. Then, the CPU 105 proceeds from S804 to S805.

In S805, the CPU 105 calculates the absolute value of the difference between the value of $VSWR_{old}$ stored in the second memory 107 and the value of $VSWR_{new}$ calculated in S804, and compares the calculated absolute value with the threshold B described above with reference to FIG. 3. When the absolute value calculated in S805 is greater than the threshold B (YES in S805), the CPU 105 proceeds from S805 to S806. When the absolute value calculated in S805 is not greater than the threshold B (NO in S805), the CPU 105 proceeds from S805 to S807.

In S806, the CPU 105 turns on the device removal flag stored in the second memory 107. Then, the CPU 105 terminates the process.

On the other hand, in S807, the CPU 105 turns off the device removal flag stored in the second memory 107. Then, the CPU 105 terminates the process.

As described above, in the third exemplary embodiment, the power transmission apparatus 100 can detect removal of the electronic device 200 even when the electronic device 200 is removed before the power transmission is stabilized. The removal detection process described above with reference to FIG. 8 may be performed together with the removal detection process described above with reference to FIG. 5 or 7.

Fourth Exemplary Embodiment

Various functions, processes, and methods described in the first to third exemplary embodiments can also be implemented by a personal computer, a microcomputer, a CPU (central processing unit), one or more processors, or the like using computer readable instructions (for example, a program) recorded on a storage medium. In a fourth exemplary embodiment described below, a personal computer, a microcomputer, a CPU (central processing unit), one or more processors, or the like is referred to as a "computer X". In the fourth exemplary embodiment, the computer readable instructions for controlling the computer X and for implementing various functions, processes, and methods described in the first to third exemplary embodiments is referred to as a "program Y".

The computer X may comprise one or more of a central processing unit (CPU), micro processing unit (MPU), or other circuitry, and may include a network of separate computers or separate computer processors.

Various functions, processes, and methods described in the first to third exemplary embodiments are implemented such that the computer X executed a program Y. In this case, the program Y may be provided to the computer X, for example, from a network or directly from a computer readable storage medium. The computer readable storage medium in the fourth exemplary embodiment may include, for example, one or more of a hard disk device, a random-access memory (RAM), a read only memory (ROM), a storage of distributed computing systems, an optical disk (such as a compact disc (CD), digital versatile disc (DVD), or Blu-ray Disc (BD)™), a flash memory device, a magnetic storage device, an optical storage device, a magneto-optical storage device, a memory card, a volatile memory, a non-volatile memory, and the like. The computer readable storage medium in the fourth exemplary embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2015-171364, filed Aug. 31, 2015, which is hereby incorporated by reference herein in its entirety.

What is claimed is:

1. A power transmission apparatus comprising:
   a power transmission unit that wirelessly transmits power to an electronic device;
   an acquisition unit that acquires a value of a standing wave ratio relating to power to be transmitted to the electronic device, when a predetermined condition is satisfied;
   an update unit that updates a reference value with the acquired value of the standing wave ratio when the acquired value of the standing wave ratio is smaller than the reference value; and
   a detection unit that detects removal of the electronic device when a difference between the acquired value of the standing wave ratio and the updated reference value is greater than a threshold.

2. The power transmission apparatus according to claim 1, wherein the predetermined condition is satisfied when a predetermined time has elapsed after the power transmission unit starts to transmit power to the electronic device.

3. The power transmission apparatus according to claim 1, wherein the predetermined condition is satisfied when a power transmission current, a power transmission voltage, a reflection current, or a reflection voltage falls within a predetermined range.

4. The power transmission apparatus according to claim 1, wherein the acquisition unit acquires a second value of a standing wave ratio when the power transmission unit transmits power to the electronic device, and acquires a third value of a standing wave ratio when a predetermined time has elapsed after the power transmission unit starts to transmit power to the electronic device, and
   wherein the detection unit detects removal of the electronic device when a difference between the acquired second value of the standing wave ratio and the acquired third value of the standing wave ratio is greater than a threshold.

5. The power transmission apparatus according to claim 1, wherein the update unit changes the threshold according to power output by the power transmission unit.

6. The power transmission apparatus according to claim 1, wherein the update unit changes the threshold in response to an update of the reference value.

7. The power transmission apparatus according to claim 1, further comprising a communication unit that wirelessly communicates with the electronic device, wherein the communication unit transmits a command to the electronic device after removal of the electronic device is detected, and wherein the power transmission unit stops transmitting power to the electronic device when the communication unit receives no response to the command.

8. The power transmission apparatus according to claim 7, wherein the communication unit acquires identification information of the electronic device, and wherein the update unit changes the threshold using the identification information.

9. The power transmission apparatus according to claim 8, wherein after removal of the electronic device is detected, the communication unit transmits a command for requesting the electronic device to send device information, and wherein the power transmission unit does not stop transmitting power to the electronic device when the electronic device responds to the command.

10. The power transmission apparatus according to claim 1, further comprising a communication unit that wirelessly communicates with the electronic device using NFC (Near Field Communication).

11. A method comprising:

causing a power transmission unit to wirelessly transmit power to an electronic device;

acquiring a value of a standing wave ratio relating to power to be transmitted to the electronic device, when a predetermined condition is satisfied;

updating a reference value with the acquired value of the standing wave ratio when the acquired value of the standing wave ratio is smaller than the reference value; and detecting removal of the electronic device when a difference between the acquired value of the standing wave ratio and the updated reference value is greater than a threshold.

12. A non-transitory storage medium that stores a program causing a computer to execute a method, the method comprising:

causing a power transmission unit to wirelessly transmit power to an electronic device;

acquiring a value of a standing wave ratio relating to power to be transmitted to the electronic device, when a predetermined condition is satisfied;

updating a reference value with the acquired value of the standing wave ratio when the acquired value of the standing wave ratio is smaller than the reference value; and detecting removal of the electronic device when a difference between the acquired value of the standing wave ratio and the updated reference value is greater than a threshold.

* * * * *